United States Patent
Stern et al.

(10) Patent No.: US 9,928,549 B2
(45) Date of Patent: Mar. 27, 2018

(54) METHODS AND SYSTEMS FOR EXPEDITED TRADING ACCOUNT FUNDING

(71) Applicant: FMR LLC, Boston, MA (US)

(72) Inventors: Hadley Rupert Stern, West Newton, MA (US); Robert C. Toole, Hingham, MA (US); John McDonough, Nahant, MA (US); Jonathan Hromi, Watertown, MA (US); Seth Warren Brooks, South Easton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/923,919

(22) Filed: Jun. 21, 2013

(65) Prior Publication Data
US 2014/0379544 A1    Dec. 25, 2014

(51) Int. Cl.
G06Q 40/04    (2012.01)
G06Q 40/02    (2012.01)

(52) U.S. Cl.
CPC .......... *G06Q 40/04* (2013.01); *G06Q 40/025* (2013.01)

(58) Field of Classification Search
CPC .................................................. G06Q 40/04
USPC .......................................................... 705/37
See application file for complete search history.

(56) References Cited

U.S. PATENT DOCUMENTS

| | | | |
|---|---|---|---|
| 7,480,633 B2 | 1/2009 | Chow et al. | |
| 7,546,266 B2 | 6/2009 | Beirne et al. | |
| 7,896,237 B2 | 3/2011 | Giesen et al. | |
| 8,538,857 B2 | 9/2013 | Greene et al. | |
| 2002/0156720 A1* | 10/2002 | Chow ................... | G06Q 40/00 705/37 |
| 2007/0088636 A1* | 4/2007 | Nault ................... | G06O 40/02 705/30 |
| 2008/0097892 A1* | 4/2008 | Yohai-Giochais ..... | G06Q 40/04 705/37 |
| 2009/0144164 A1* | 6/2009 | Wane .................... | G06Q 20/10 705/17 |
| 2010/0169236 A1* | 7/2010 | Bregstein et al. .......... | 705/36 R |

\* cited by examiner

*Primary Examiner* — Namrata Boveja
*Assistant Examiner* — Liz P Nguyen
(74) *Attorney, Agent, or Firm* — Proskauer Rose LLP

(57) ABSTRACT

A computer-implemented method is provided for opening an expedited account for a user. The method includes receiving a request from the user to make a trade associated with at least one financial instrument, in the absence of an account being opened for the user. The method includes determining a plurality of factors in response to the request, the plurality of factors including 1) a credit worthiness score of the user; 2) a source of capital identified by the user to cover the trade; and 3) a type of the at least one financial instrument associated with the trade. The method also includes opening the expedited account for the user with limited trading privileges, in which an amount of fund for trading is advanced to the user based on the plurality of factors. The method further includes allowing the user to make a trade up to the amount of fund advanced.

16 Claims, 5 Drawing Sheets

```
100
```

102 — Receive a request from a user to make a trade associated with at least one financial instrument, in the absence of an account being opened for the user.

104 — Determine a plurality of factors in response to the request

106 — Open an expedited account for the user with limited trading privileges, in which an amount of fund for trading is advanced to the user based on the plurality of factors 108 — Authorize the user to make a trade up to the amount of fund advanced 8 Cash 7 Stock Certificates 6 Cashiers Check 5 Credit Card 4 Bank Account #

3 PayPal

2 Personal Check

1 Account # on Form

FIG. 2

| Combined Scores | Fund Advancement | Privileges |
|---|---|---|
| 0 | 0 | Expedited account denied |
| 30 | $3000 | Restricted trading from a list of 20 pre-approved investments |
| 70 | $7000 | Restricted trading from a list of 50 pre-approved investments |
| 100 | $10000 | Same privileges as a regular account |

METHODS AND SYSTEMS FOR EXPEDITED TRADING ACCOUNT FUNDING

FIELD OF THE INVENTION

The invention relates generally to computer-implemented methods and apparatuses, including computer program products, for opening an expedited trading account for a user.

BACKGROUND OF THE INVENTION

Traditionally, if a user desires to trade on a financial instrument, the user needs to take the initiative of opening an account with a financial institution and fund the account with an appropriate amount to cover the trade. Specifically, traditional steps involved in opening and funding an account include performing background and/or credit checks on the user and clearing the fund transferred into the account by the user before allowing the user to place a trade. The account can be funded by a variety of means, such as check deposit (e.g. via CHECKscan™) or fund transfer from other accounts (e.g. bank, PayPal, or iTunes). However, there is often a significant lag time, sometimes up to a period of days, between the time when the user decides to open the account and the time when trading can begin. This can not only delay the user's ability to place a trade when the user does not have an account with a financial institution, but also negatively impact the profit margin of the financial institution offering the trading service.

SUMMARY OF THE INVENTION

Thus, systems and methods are needed to reduce the delay in time from account opening to actual trading. The present invention allows the user to open an expedited account and trade with some or all of the pending assets prior to the completion of the fund transfer. A financial institution's decision to fund a user's trade request and the level of funding involved can be based on a unique combination of one or more factors.

In one aspect, a computer-implemented method is provided for opening an expedited account for a user. The method includes receiving a request from the user to make a trade associated with at least one financial instrument, in the absence of an account being opened for the user. The method includes determining, by a computing device, a plurality of factors in response to the request. The plurality of factors including 1) a credit worthiness score of the user; 2) a source of capital identified by the user to cover the trade; and 3) a type of the at least one financial instrument associated with the trade. The method also includes opening, by the computing device, the expedited account for the user with limited trading privileges, in which an amount of fund for trading is advanced to the user based on the plurality of factors. The method further includes authorizing, by the computer device, the user to make a trade up to the amount of funds advanced.

In some embodiments, the method further includes clearing, by the computing device, transfer of the capital identified by the user to cover the trade and converting, by the computing device, the expedited account to a regular account by increasing trading privileges of the user.

In another aspect, a system is provided for opening an expedited account for the user. The system comprises a processor including an interface module, a computation module, an account opening module, and a trade module. The interface module is configured to receive a request from the user to make a trade associated with at least one financial instrument, in the absence of an account being opened for the user. The computation module is configured to determine a plurality of factors in response to the request. The plurality of factors include 1) a credit worthiness of the user; 2) a source of capital identified by the user for covering the trade; and 3) a type of the at least one financial instrument associated with the trade. The account opening module is configured to open the expedited account for the user with limited trading privileges, in which an amount of fund for trading is advanced to the user based on the plurality of factors. The trade module is configured to authorize the user to make a trade up to the amount of fund advanced.

In yet another aspect, a computer program product, tangibly embodied in a non-transitory computer readable medium, is provided for advancing fund to a user prior to opening an account for the user. The computer program product includes instructions being configured to cause data processing apparatus to receive a request from the user to make a trade associated with at least one financial instrument, in the absence of an account being opened for the user. The instructions are configured to determine a plurality of factors in response to the request. the plurality of factors include i) a credit worthiness score of the user; 2) a source of capital identified by the user to cover the trade; and 3) a type of the at least one financial instrument associated with the trade. The instruction are also configured to open the expedited account for the user with limited trading privileges, in which an amount of fund for trading is advanced to the user based on the plurality of factors. The instructions are further configured to authorize the user to make a trade up to the amount of funds advanced.

In other examples, any of the aspects above can include one or more of the following features. In some embodiments, a combined score is further calculated based on the plurality of factors and the amount of fund advanced is proportional to the combined score. The combined score can be adjusted in response to the user visiting a branch office to perform in-person authentication. A token can be issued to the user based on the authentication. The user can be allowed to initiate the trade online using the token via the expedited account.

In some embodiments, the limited trading privileges include preventing the user from trading on a different financial instrument other than the financial instrument initially requested. In some embodiments, the limited trading privileges include preventing the user from trading beyond the amount of fund advanced. In some embodiments, the limited trading privileges include preventing the user from trading on the financial instrument if the financial instrument is not on a pre-approved list of financial instruments.

In some embodiments, receiving the request from the user to make a trade includes receiving the request from a mobile device upon the user selecting a promotion issued by a financial institution offering the financial instrument. In some embodiments, determining the credit worthiness score of the user includes determining at least one of a credit score of the user, one or more assets the user maintains with at least one financial institution, and employment history of the user.

In some embodiments, a first degree of risk associated with the source of capital is determined for covering the trade. The first degree of risk reflects the liquidity of the capital. In some embodiments, a second degree of risk associated with the type of the financial instrument is determined. The second degree of risk reflects the volatility of the financial instrument. A combined score can be computed based on the credit worthiness score, the first degree of risk, and the second degree of risk and the amount of fund is advanced to the user in proportion to the combined score.

In some embodiments, the amount of fund advanced to the user is up to a percentage of the capital the user identified to cover the trade. The percentage can be determined based on the plurality of factors.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIG. 2 shows an exemplary sliding scale of risks correlated to the method of funding chosen by the user to cover the desired trade.

DESCRIPTION OF THE INVENTION

Figure 1:
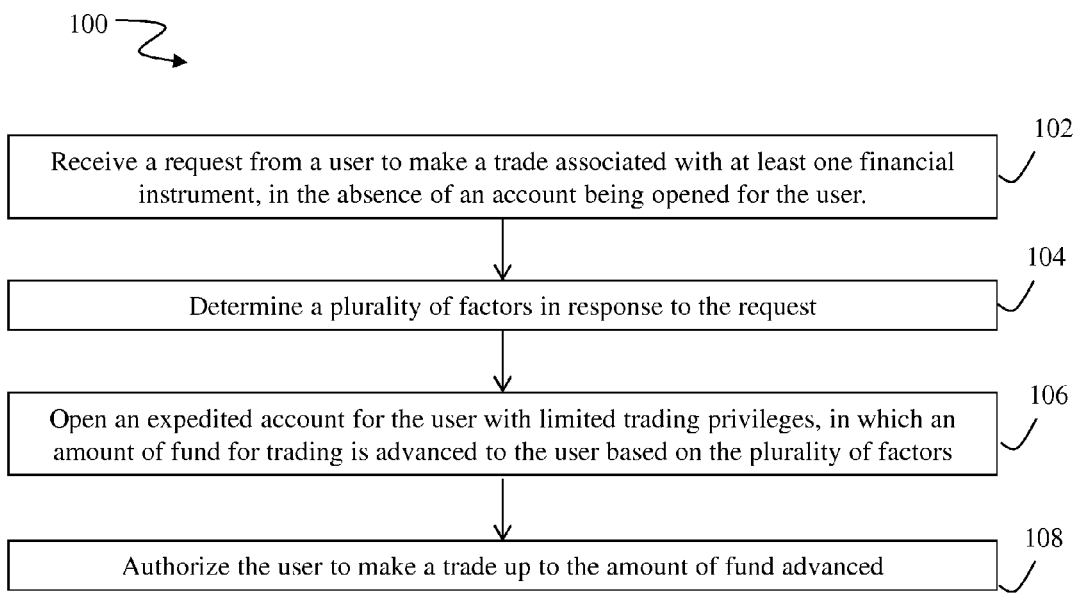
FIG. 1 shows an exemplary process for opening an expedited trading account for a user.

FIG. 1 shows an exemplary process for opening an expedited account for a user. For the purpose of this invention, an "expedited account" means an account that is opened in a relatively short time from when the account-opening request is made, such as in real time, near real time, a matter of hours, or within one business day. Through an expedited account, a user can place a trade even before the fund transferred by the user to cover the trade is cleared. For example, the user is allowed to trade in real time, near real time, a matter of hours, or within one business day, from the time when the account is opened, without the financial institution having received the fund to cover the cost of the financial instrument desired. For the purpose of this invention, a "financial instrument" means a tradeable asset of any kind, such as an ownership interest in an entity, or a contractual right to receive or deliver cash or another financial instrument.

The process 100 starts when a financial institution receives a request from a user to make a trade associated with at least one financial instrument, in the absence of the user maintaining an account with the financial institution (step 102). The request can be initiated by the user, for example, after the user receives a marketing solicitation or promotion for an offer to trade on a mobile device. The user can electronically initiate the request by sending a reply to the financial institution in response to the marketing solicitation or physically appear at a local branch of the financial institution to start the process.

After receiving a trade request, the financial institution can evaluate one or more factors to determine whether an expedited account can be opened for the user (step 104). Following a positive evaluation, the financial institution can open the expedited account for the user with limited trading privileges, in which the financial institution advances a specific amount of fund to the user for trading (step 106). Hence, the user is authorized to trade up to the amount of fund advanced (step 108), regardless to whether the fund transferred by the user to cover the trade is actually received (i.e. cleared) by the financial institution. The factors used by a financial institution to determine expedited account opening and/or the amount fund advanced can include: 1) a credit worthiness score of the user; 2) the source of capital identified by the user to cover the trade; and 3) the type of financial instrument the user desires to trade.

The user's creditworthiness score can be determined based on, for example, a credit score of the user obtain from a credit bureau, one or more assets the user maintains with the financial institution or with other fiduciary institutions, job history of the user, and/or other parameters affecting the likelihood that the user defaults on the fund advancement. The user can supply pertinent information to the financial institution to establish his credit worthiness, such as his social security number, financial information, etc.

The source of capital identified by the user to cover the trade (i.e., the user's chosen method to fund the trade) can also impact the availability and/or amount of funding the financial institution provides. This is because it reflects the volatility of the fund being deposited, thus the likelihood that the financial institution will receive the fund transfer. FIG. 2 shows an exemplary sliding scale of risks correlated to the method of funding chosen by the user to cover the desired trade. As shown, funding a trade with cash may be assigned the highest score reflecting that it is the least risky form of funding. The score decreases with more risky funding types, such as providing a personal check or a bank account number on a request form.

The type of the financial instrument the user desires to trade can also play a role in determining funding availability and/or funding level. An investment type score can be assigned to a financial instrument reflecting its relative risk. For example, stocks or bonds that have low risk levels may be assigned higher scores in comparison to more volatile stocks or bonds. In some embodiments, a higher score is assigned to a financial instrument if the financial institution has the authority to prevent liquidation of the financial instrument for a fixed period of time. In some embodiments, a higher score is assigned to a financial instrument if it is on a list of securities pre-approved by the financial institution.

Based on the three factors described (the credit worthiness score, source of capital and financial instrument type), a financial institution can calculate a combined score to determine the availability and level of fund advancement. In general, a strong combined score permits user access to most or entire fund associated with a trade request and a low score gives the user access to significantly less. The financial instruction can even decline extending an expedited account to the user if the combined score is too low. The financial institution can make such a determination by comparing the combined score to one or more predetermined thresholds. The combined score can be simply a sum of three scores associated with the three factors. The combined score can also be a weighted sum of the three scores. For example, when determining fund advancement, the financial institution may place more emphasis on credit worthiness than other factors. Hence, the credit worthiness score can be assigned a greater weight in comparison to the other factors. Additional factors can also contribute to the combined score, such as the duration of the requested financial instrument, where a longer-duration investment or an investment with a defined life span may be preferred (e.g., a bond or a preferred stock with known duration). Another factor can be the location/origination of the instrument. For example, a U.S. government bond may be preferred over a Greek Government bond due to the economic instability in Greece. Yet another factor can be the currency that the instrument is denominated in, such as Russian Rubles versus Polish Zolty or U.S. dollars, which have different characteristics and risks.

The combined score can be used to determine the amount of funding advanced, which can be proportional to the combined score, but does not exceed the amount transferred by the user to cover the trade request. Once the user receives the cash advancement from the financial institution, the user is authorized to place a trade up to the amount of fund advanced (step 108), regardless to whether the fund transferred by the user to cover the trade is actually received (i.e. cleared) by the financial institution. The expedited account can be associated with limited trading privileges. For example, for a user of an expedited account, the financial institution can prevent the user from trading on a different financial instrument than that initially specified at the account-opening stage (step 102). That is, the user is only authorized to purchase the requested financial instrument using the advanced fund. The financial institution can prevent the user from trading beyond the amount of fund advanced. The financial institution can also prevent the user from trading on a financial instrument that is not on a list of pre-approved investments. In some embodiments, the extent of the limitations is variable depending on the combined score. For example, if the combined score is sufficiently high (i.e., higher than a certain threshold), the user can invest in any financial instrument that is offered through the financial institution. However, if the user's combined score is low, the user is only authorized to trade from a pre-approved list of financial instruments. In addition, the time between the trade request initiation and the opening of the expedited account can be shortened with a high combined score. In some embodiments, trading through an expedited account can be enhanced by shadow posting, where a trade or any other change to account status can be posted intra-day, close to the time of transaction, as oppose to at a scheduled time in the time (e.g., at end of day or close of business).

Figure 3:
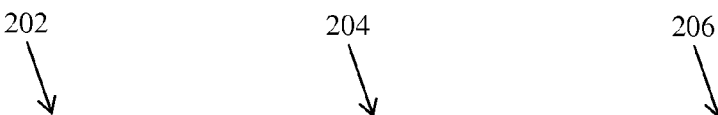
FIG. 3 shows an exemplary table correlating combine scores with amount of fund advanced and privileges granted to an expedited account.

FIG. 3 shows an exemplary table correlating combine scores with the amount of fund advanced through an expedited account and the privileges granted to the expedited account. As shown, column 202 provides a list of exemplary combined scores, column 204 provides a list of funding amounts correlated to the combined scores of column 202, and column 206 provides a list of trading privileges associated with the combined scores of column 202. In some embodiments, the amount of money advanced for trading (Z) through an expedited account is a percentage (X) of the cost of the trade (Y) initially requested by the user (i.e., Z=X*Y). This percentage (X) can be determined based on the combined score. For example, on a scale of 0 to 100, with 100 being the highest score, a user with a combined score of 70 can be assigned a percentage of 70% and given an advancement of 70% of the value of the trade requested during account opening. Therefore, if the investment costs $10,000, the user is given an advancement of $7,000 if the combined score is 70. Alternatively, one or more threshold can be used to determine the level of fund advancement. Privileges assigned to an expedited account can also depend on the combined score. For example, a score of 0 can lead to the financial institution declining to open an expedited account for the user while a score of 100 can lead to the financial institution opening an expedited account with the same privileges as a regular account. A score of 70 can correlate to limited trading from a list of 50 pre-approved investments, for example. A score of 30 can correlate to limited trading from a list of 20 pre-approved investments, with the investments being more conservative than the list of 50 pre-approved investments associated with a score of 70.

In some embodiments, after the fund identified by the user to cover the trade is finally cleared by the financial institution, the financial institution can automatically convert the expedited account to a regular account, thereby granting the user full trading privileges, such as allowing the user to trade on any financial instrument desired or trade up to any amount desired if the user transfers sufficient fund to the account. Alternatively, the financial institution can open a separate, regular account for the user and close the expedited account after the fund transfer is completed. The financial institution can recover the amount of funds advanced through the expedited account by taking the same amount (plus interest in some instances) from the fund deposited into the account by the user.

Figure 4:
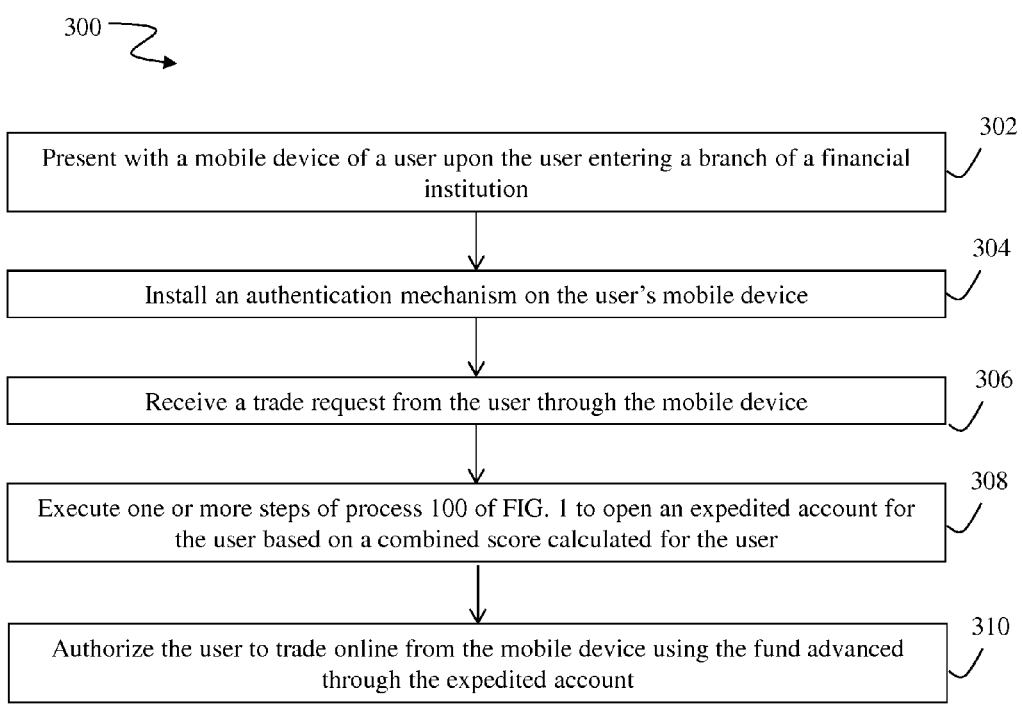
FIG. 4 shows an exemplary approach for further accelerating the expedited account opening process of FIG. 1.

FIG. 4 shows an exemplary approach for further accelerating the expedited account opening process of FIG. 1. In general, the combined score for determining the availability/limit of fund advancement and/or the waiting period for making the advanced fund available to the user can be improved if the user visits a local branch of the financial institution. This is because an in-person meeting can reduce the likelihood that the trade request is a scam. As shown in FIG. 4, upon a user entering the local branch of the financial institution, the user presents his mobile device (e.g., a tablet or iPad) to a service representative (step 302). The mobile device may display a solicitation message from the financial institution advertising a certain financial product. In response, the service representative can obtain certain verification data from the user, such as reading an electronic ID associated with the user's mobile device or obtaining a copy of the user's driver's license or passport. The service representative can then install an authentication mechanism (e.g., an electronic token) on the user's mobile device (step 304) and the token may have a limited temporal life on the mobile device. When the authentication token is active, the user can initiate a trade request online through the mobile device (step 306), at which point one or more steps of process 100 of FIG. 1 are executed to determine a combined score for the user and open an expedited account with limited fund advancement for the user based on the combined score (step 308). The combined score can be improved (e.g., adding 10 points to the combined score) if the presence of a token is detected. For example, the presence of a token can be another factor contributing to the combined score. Such an improvement to the combined score can lead to many advantages. For example, the time between the trade request initiation and the opening of the expedited account can be shortened due to the detection of the token. The availability and/or amount of fund advanced through the expedited account can also be improved due to the presence of the token.

The user is authorized to trade online from the mobile device using the fund advanced through the expedited account (step 310). The token can enable the user to access additional trading features online, such as an application to visualize how different types of investment patterns potentially change the user's current portfolio performance. If the token has a limited temporal life, the user is barred from making further trades once the token expires, at which time the expedited account is either deleted or converted to a regular account without any temporal constraints.

Figure 5:
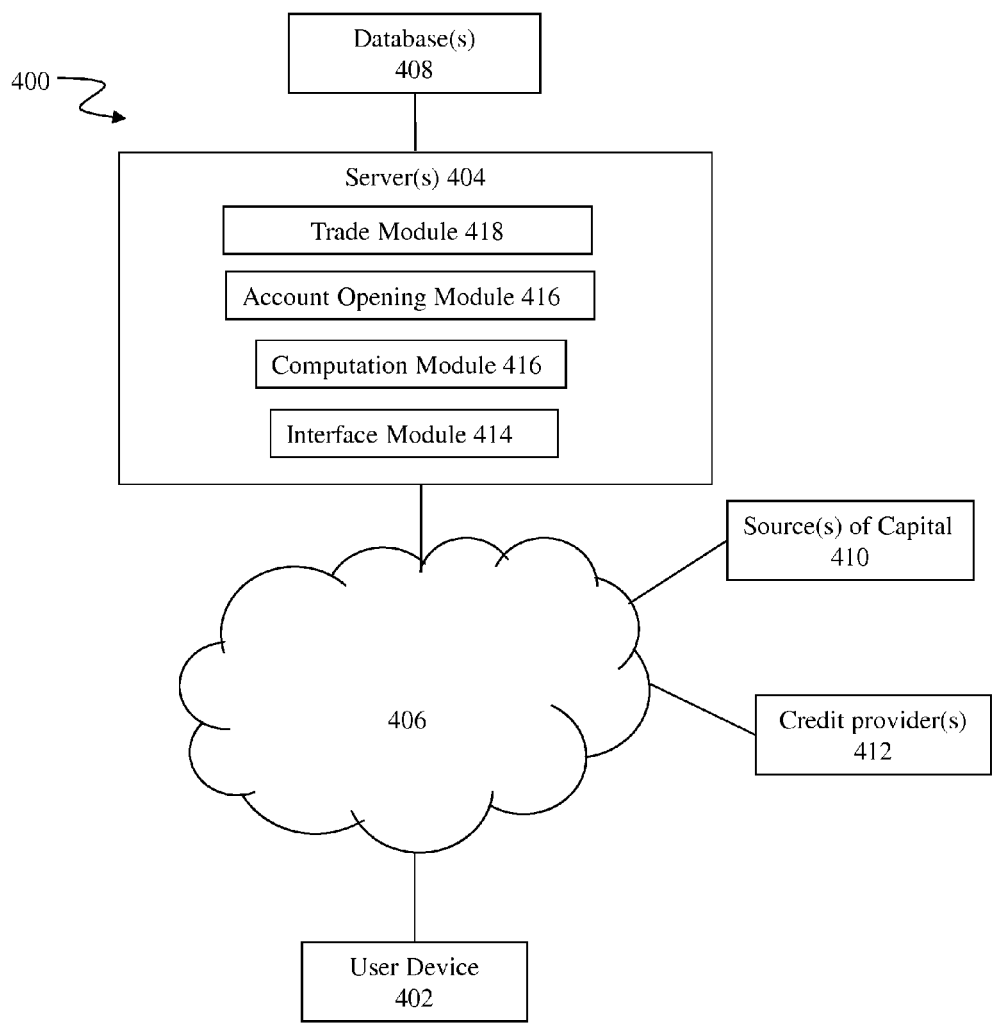
FIG. 5 shows an exemplary network environment.

FIG. 5 shows an exemplary network environment, according to some embodiments of the present invention. The network environment includes a user device 402 communicating with at least one server 404 via an IP network 406. The user device 402 can be a device capable of displaying web content. The user device 102 can be a home computer or a mobile device, such as an iPad or an iPhone. From the user device 102, a user can initiate a trade request with respect to at least one financial instrument offered by a financial institution. In other embodiments, the user can imitate the trade request by visiting a local branch of the financial institution.

The financial institution can use the server 404 to process the user's trade request. For example, the server 404 can be configured to implement one or more steps of process 100 of FIG. 1 and/or process 300 of FIG. 4 to open an expedited account for the user with advanced funding capabilities. In an exemplary configuration, the server 404 includes an interface module 414, a computation module 416, an account opening module 418 and a trade module 418, each of which can be implemented as a combination of hardware and software or hardware only.

The interface module 414 is configured to receive a request from the user to make a trade associated with at least one financial instrument, in the absence of a user account. In some embodiments, along with the trade request, the user specifies one or more sources of capital 410 for funding the trade request. The interface module 414, upon receiving such information, can interact with at least one funding source 410 via the IP network 406 to verify and transfer the fund. In some embodiments, along with the trade request, the user supplies sufficient data to enable the server 404 to establish the credit worthiness of the user. Based on the data, the interface module 414 can interact with one or more credit providers 412 to determine the user's credit worthiness.

The computation module 416 is configured to multiple factors corresponding to the user's trade request, such as i) the credit worthiness of the user; 2) the riskiness of the source of capital identified by the user to cover the trade; and 3) the riskiness of the type of financial instrument requested by the user. Based on the evaluation, the computation module 416 can generate a combined score that reflects the overall fitness of the user for receiving advanced funding through an expedited account.

Based on the combined score, the account opening module 418 of the server 404 can open an expedited account for the user with limited trading privileges, in which an amount of fund for trading is advanced to the user. For example, the account opening module 418 can open an expedited account for the user if the combined scored generated by the computation module 416 is above a predetermined threshold. The trade module 418 authorizes the user to make a trade up to the amount of fund advanced.

The server 404 is in electrical communication with at least one database 408 for storing information related to i) the user, ii) different potential sources of capital 410 and/or iii) different credit providers 412. In general, the data databases 408 can store any information useful to the server 404 to successfully execute processes 100 and 300 of FIGS. 1 and 4, respectively.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method for opening an expedited account for a user, the method comprising:
   with a processor of at least one server computing device of an expedited account opening system comprising an interface module, a computation module, an account opening module, and a trade module:
   receiving, by operation of the interface module, a request from a remote computing device of the user to make a trade associated with at least one financial instrument, a source of capital identified by the user to cover the trade, and an amount of capital to be transferred by the user to cover the trade, in the absence of an account being opened for the user;
   determining, by operation of the computation module, an amount of funds to advance to the user in response to the request, comprising:
      determining, by operation of the computation module, a plurality of factors including 1) a first risk associated with a credit worthiness score of the user representing the likelihood that the user will default on the amount of funds for trading advanced by the computing device; 2) a second risk associated with the source of capital representing the likelihood the capital will be received from the user to cover the trade; and 3) a third risk associated with a type of the at least one financial instrument representing the volatility of the type of the financial instrument;
      assigning, by the operation of computation module, a numerical value to each of the first, second and third risks;
      calculating, by operation of the computation module, a combined score as a sum of the numerical values corresponding to the first, second and third risks;
      adjusting, by operation of the computation module, the combined score based upon presence of an electronic token on the remote computing device, the electronic token being installed on the remote computing device after the computation module requests identity verification data from the remote computing device and validates the identity verification data, the electronic token having a limited temporal life on the remote computing device; and
      determining, by operation of the computation module, the amount of funds to advance that is proportional to the combined score, but less than the amount of the capital identified by the user to cover the trade;
   opening, by operation of the account opening module, the expedited account for the user with limited trading privileges regardless of completion of transfer of the amount of capital identified by the user to cover the trade;
   authorizing, by operation of the trade module, the remote computing device to make a trade up to the amount of funds advanced after validating the electronic token installed on the remote computing device; and
   upon expiration of the limited temporal life of the electronic token, automatically restricting, by operation of the trade module, the remote computing device from connecting to the trade module to make subsequent trades using the expedited account.

2. The computer-implemented method of claim 1, further comprising:
   clearing, by operation of the trade module, transfer of the capital identified by the user to cover the trade; and
   converting, by operation of the trade module, the expedited account to a regular account by increasing trading privileges of the user.

3. The computer-implemented method of claim 1, wherein the limited trading privileges comprise preventing, by operation of the trade module, the remote computing device to trade on a different financial instrument than the at least one financial instrument.

4. The computer-implemented method of claim 1, wherein the limited trading privileges comprise preventing, by operation of the trade module, the remote computing device to trade beyond the amount of fund advanced.

5. The computer-implemented method of claim 1, wherein the limited trading privileges comprise preventing, by operation of the trade module, the remote computing device to trade on the financial instrument if the financial instrument is not on a pre-approved list of financial instruments.

6. The computer-implemented method of claim 1, wherein receiving the request from the remote computing device to make a trade comprises receiving the request from a mobile device upon the user selecting a promotion issued by a financial institution offering the financial instrument.

7. The computer-implemented method of claim 1, wherein determining the first risk associated with the credit worthiness score of the user comprises determining a risk corresponding to at least one of a credit score of the user, one or more assets the user maintains with at least one financial institution, or employment history of the user.

8. The computer-implemented method of claim 1, further comprising advancing, by operation of the trade module, the amount of fund up to a percentage of the capital the user identified to cover the trade.

9. The computer-implemented method of claim 8, wherein the percentage is determined based on the plurality of factors.

10. The computer-implemented method of claim 1, wherein the electronic token is installed on the remote computing device in response to the user visiting a branch office to perform in-person authentication.

11. A system for opening an expedited account for the user, the system comprising a processor of at least one computing device comprising an interface module, a computation module, an account opening module and a trade module being configured to:
    receive, by operation of the interface module, a request from a remote computing device of the user to make a trade associated with at least one financial instrument, a source of capital identified by the user to cover the trade, and an amount of capital to be transferred by the user to cover the trade, in the absence of an account being opened for the user;
    determine, by operation of the computation module, an amount of funds to advance to the user in response to the request, including
        determining a plurality of factors including 1) a first risk associated with a credit worthiness of the user representing the likelihood that the user will default on the amount of funds for trading advanced by the computing device; 2) a second risk associated with the source of capital representing the likelihood the capital will be received from the user to cover the trade; and 3) a third risk associated with a type of the at least one financial instrument representing the volatility of the type of the financial instrument;
        assigning a numerical value to each of the first, second and third risks;
        calculating a combined score as a sum of the numerical values corresponding to the first, second and third risks;
        adjusting the combined score based upon presence of an electronic token on the remote computing device, the electronic token being installed on the remote computing device after the computation module requests identity verification data from the remote computing device and validates the identity verification data, the electronic token having a limited temporal life on the remote computing device; and
        determining the amount of funds to advance that is proportional to the combined score, but less than the amount of the capital identified by the user to cover the trade;
    open, by operation of the account opening module, the expedited account for the user with limited trading privileges regardless of completion of transfer of the amount of capital identified by the user to cover the trade;
    authorize, by the trade module, the remote computing device to make a trade up to the amount of fund advanced after validating the electronic token installed on the remote computing device; and
    upon expiration of the limited temporal life of the electronic token, automatically restrict, by operation of the trade module, the remote computing device from connecting to the trade module to make subsequent trades using the expedited account.

12. The system of claim 11, wherein the computation module is configured to determine the credit worthiness score of the user based on at least one of a credit score of the user, one or more assets the user maintains with at least one financial institution, or employment history of the user.

13. The system of claim 11, wherein the trade module is configured to prevent the remote computing device from trading on a different financial instrument or trading beyond the amount of fund advanced.

14. A computer program product, tangibly embodied in a non-transitory computer readable medium, for opening an expedited account for a user, the computer program product including instructions operable to cause a processor of at least one computing device of an expedited account opening system comprising an interface module, a computation module, an account opening module, and a trade module to:
    receive, by operation of the interface module, a request from a remote computing device of the user to make a trade associated with at least one financial instrument, a source of capital identified by the user to cover the trade, and an amount of capital to be transferred by the user to cover the trade, in the absence of an account being opened for the user;
    determine, by operation of the computation module, an amount of funds to advance to the user in response to the request, comprising:
        determine, by operation of the computation module, a plurality of factors including i) a first risk associated with a credit worthiness score of the user representing the likelihood that the user will default on the amount of funds for trading advanced by the computing device; 2) a second risk associated with the source of capital representing the likelihood the capital will be received from the user to cover the trade; and 3) a third risk associated with a type of the at least one financial instrument representing the volatility of the type of the financial instrument;
        assign, by operation of the computation module, a numerical value to each of the first, second and third risks;
        calculate, by operation of the computation module, a combined score as a sum of the numerical values corresponding to the first, second and third risks; and
        adjust, by operation of the computation module, the combined score based upon presence of an electronic token on the remote computing device, the electronic token being installed on the remote computing device after the computation module requests identity verification data from the remote computing device and validates the identity verification data, the electronic token having a limited temporal life on the remote computing device; and determine, by operation of the computation module, the amount of funds to advance that is proportional to the combined score, but less than the amount of the capital identified by the user to cover the trade;

open, by operation of the account opening module, the expedited account for the user with limited trading privileges regardless of completion of transfer of the amount of capital identified by the user to cover the trade; and authorize, by operation of the trade module, the remote computing device to make a trade up to the amount of funds advanced after validating the electronic token installed on the remote computing device; and upon expiration of the limited temporal life of the electronic token, automatically restrict, by operation of the trade module, the remote computing device from connecting to the trade module to make subsequent trades using the expedited account.

15. The computer-implemented method of claim 1, wherein calculating the combined score is further based on at least one of the duration of the financial instrument, the origination of the financial instrument, or the currency that the financial instrument is denominated in.

16. The computer-implemented method of claim 1, wherein the combined score comprises a weighted sum of the first risk, the second risk and the third risk.

\* \* \* \* \*